United States Patent [19]

Walter et al.

[11] Patent Number: 4,979,967
[45] Date of Patent: Dec. 25, 1990

[54] CONTAMINANT TRANSPORT APPARATUS

[75] Inventors: Scott D. Walter, Islip Terrace, N.Y.; Robert E. Katz; Frank Weidner, both of Saddle River, N.J.; Patrick M. Ball, Yaphank, N.Y.

[73] Assignee: Microclean Environmental Transport Services, Ltd., Hackensack, N.J.

[21] Appl. No.: 347,509

[22] Filed: May 4, 1989

[51] Int. Cl.$^5$ .............................................. B01D 47/06
[52] U.S. Cl. ................................ 55/84; 55/94; 55/212; 55/223; 55/259; 55/356; 55/500
[58] Field of Search ............. 55/84, 93, 213, 217, 55/223, 259, 356, 472, 94, 500

[56] References Cited

U.S. PATENT DOCUMENTS

| | | | |
|---|---|---|---|
| 3,633,340 | 1/1972 | Illingworth | 55/84 |
| 3,701,235 | 10/1972 | Isaacson | 55/84 |
| 4,544,380 | 10/1985 | Itou et al. | 55/93 X |
| 4,662,899 | 5/1987 | Tandon | 55/213 X |
| 4,676,811 | 6/1987 | Wade | 55/223 |
| 4,774,974 | 10/1988 | Teter | 134/110 |
| 4,786,295 | 11/1988 | Newman et al. | 55/213 |
| 4,818,259 | 4/1989 | Marand | 55/259 |

*Primary Examiner*—Charles Hart
*Attorney, Agent, or Firm*—Kenyon & Kenyon

[57] ABSTRACT

An apparatus and method for transporting hazardous, toxic or nuisance materials from the controlled chambers of removal sites to disposal sites and containing these materials by controlling the environment within the cargo area of a transport vehicle and for some distance outside it. The apparatus comprises a cargo chamber to control leakage and air flow, a regulated air handler to maintain a predetermined vacuum pressure within the cargo area relative to outside ambient pressure, a filtering system to trap air borne particles before exhausting into the outside environment and a wetting means, filter means and containment process for larger contaminates. The unit is self sufficient to provide its own generated electricity, liquid flow supply and automated control process enabling the containment system to function under stationary or mobile conditions for extended periods.

20 Claims, 6 Drawing Sheets

CONTAMINANT TRANSPORT APPARATUS

FIELD OF INVENTION

The present invention comprises an apparatus for the safe handling, containment and transportation of hazardous, toxic or nuisance particulates.

BACKGROUND OF THE INVENTION

For purposes of this disclosure, the term "materials", "contaminants" and "particulates" as used herein should be understood to mean any dispersible hazardous, toxic, or nuisance matter which can be organic or inorganic, or admixtures adsorbed or sorbed upon each otter. These materials, contaminants and particulates are generally low-weight pieces of larger materials that have fractured or otherwise been broken down and tend to be less than 5-10 microns in size and disperse in the air with shifting air currents, thereby causing their removal from the atmosphere to be particularly difficult. The particulates may also be in the form of dust particles formed in the processing of larger materials. The materials may also be of larger particle size and less likely to become dispersed in the air.

The safe removal, transport and eventual disposal of hazardous, toxic and nuisance materials has become of particular importance in this age of concern for the environment. To this end, many federal, state and even local regulations have been enacted that first identify, then seek to regulate, the handling of potentially hazardous materials. A number of these regulations concern the handling and disposal of asbestos, a known carcinogen.

The Environmental Protection Agency (EPA) and Occupational Health and Safety Agency (OSHA) have major responsibility for regulatory control over exposure to asbestos. Emissions of asbestos to the ambient air are regulated under Section 112 of the Clean Air Act, which establishes the National Emission Standards for Hazardous Air Pollutants (NESHAPs). The regulations specify control requirements for most asbestos emissions, including work practices to be followed to minimize the lease of asbestos fibers during handling of asbestos waste materials. For example, section 177.844 of the EPA's "Hazardous Materials Guide" requires that "Asbestos must be loaded, handled, and unloaded, and any asbestos contamination of transport vehicles removed, in a manner that will minimize occupational exposure to airborne asbestos particles released incident to transportation."

The regulatory interest in asbestos and other hazardous wastes has also spawned a number of patents directed to the removal, handling and eventual disposal of these contaminants. These patents, among other things, are directed to the removal of asbestos, the filtration of the air in which the removal is taking place, and the eventual disposal of the asbestos. In particular, many of the patents are directed to problems in dealing with asbestos and other contaminants because of their extremely small particle size. For example, it has been found that the average asbestos fiber is about 0.1 micron in diameter and less than 5 microns in length; this small size and corresponding low weight resulting in many of the asbestos fibers easily becoming airborne with shifting air currents.

While much attention has been given to controlling the environment where the asbestos removal is taking place, and to disposal of the contaminants, insufficient regard has been given to the actual handling and transport of the asbestos once it has been removed. The result is that the controls that exist with respect to removal and eventual disposal are being circumvented.

Existing methods of containing and handling hazardous materials, particularly asbestos, which takes place in a controlled chamber, comprises packaging of the particulates, then loading and transport of these packages in various forms of transportable containment vessels, has fallen short of protecting the outside environment from the potential and real danger these contaminants produce. The current practice is to rely on the package itself when in fact it is well known in the containment and transport industry that the controlled chambers may not be adequately connected to the transport apparatus to prevent accidental release of contaminants and that workers sometimes use defective and damaged packaging materials, and otherwise exercise practices that risk release of the contaminants to the outside atmosphere.

Systems that rely on extending the controlled chamber from the contaminated site to the transport containment vessel are known, such as in U.S. Pat. No. 4,774,974 to Teter, however, such systems may be of limited utility. It is common industry practice that asbestos and other hazardous waste removal take place in a site that has been modified by the addition of some sort of enclosure to prevent the accidental release of the contaminants to the unprotected air, i.e., a controlled chamber. Controlled chambers are expensive, however, particularly when it is common practice to extend them to encompass the containment vessel that is to transport the removed contaminants. In other words, the transportable containment vessel is essentially part of the controlled chamber during the removal and loading operation.

The present system for handling contaminants is not, however, very practical. For example, much of the asbestos removal that takes place in major cities involves older multistory facilities that cannot be readily accessed from where the known containment vessels would have to be situated. Further, it is often the case that the asbestos is only being removed from selected parts of a structure, while other parts are still in use, thereby requiring that the removal system be as non-disruptive as possible. In addition, the known systems require that the unit be present at all times during asbestos removal, thereby necessitating a separate, expensive unit at each work site.

It is common industry practice that after the asbestos or other hazardous particulate is removed from the walls, ceilings and other parts of a structure, the particulate is encased in bags which may be readily moved and eventually disposed of. Such bagging practice also enjoys significantly reduced costs, which makes it all the more attractive to practitioners of asbestos and other hazardous waste removal.

Various forms of bags are used to enclose the particulate prior to its eventual disposal. As exemplified in U.S. Pat. Nos. 4,229,193; 4,626,291; 4,718,925; 4,726,825; 4,746,175; 4,749,391; 4,765,352; and 4,783,129, the filling of the bags commonly is accomplished in the controlled chamber where the contaminant is located. The bags are then handled and moved from the controlled chamber and cut to the apparatus to be loaded and used to transport this material to the waste disposal site. Careful procedures are used to remove and bag the material, however, airborne micro particulates within the removal site may attach to the exterior surface of the bags and protective suits worn by the workers.

The result of such a procedure is that contamination of the environment may be occurring in a number of ways. First, as the workers leave the controlled chamber while handling the bags of contaminant, the particulate that has clung to the outside of their protective garb and isolating bags may be released. This release occurs between the controlled chamber where removal is occurring and the transport apparatus. Accordingly, the protection afforded by the controlled chamber is being circumvented.

The second manner of potential contamination involves the manner in which the bags are loaded into the cargo chambers of vehicles for transport to disposal sites. These vehicles, while designed for general freight use, are relatively incapable of environmentally controlling the containment vessel. The bags of particulate are generally loaded from the front, opposite the access door, to the rear of the vehicle, and stacked upon themselves as high as the chamber height will allow. It should be noted that the bags of particulate may be quite heavy, as it is often the case that the particulate is wetted down during the removal and bagging process. The weight of the bags stacked on top causes compression of the lower bags which may result in the release of any entrapped air from within the bags via either where the bag has been sealed, such as by tape or twist-ties, or cause the bursting of the bags. The result of such accidental release is that macro and micro-sized particulates escape the bags into the environment of the containment vessel, and eventually the atmosphere.

Alternatively, and less desirably, the controlled chamber in which removal is taking place is extended to encompass the transport apparatus. This may occur by sealing the transport vehicle to the control chamber or as in U.S. Pat. No. 4,774,974, discussed above, by running tubes from the transport apparatus to the control chamber. Such extension is substantially equivalent to connecting the control chamber and transport apparatus by virtue of a seal.

In addition, it is well known in the waste transportation industry that freight may be damaged during handling and transport. Damage in handling may result from, among other things, the excessive weight of the bags of particulate or from improper bag sealing procedures. As for damage in transport, it is not uncommon in transporting general freight to see broken cartons, boxes, skids and even protective crates resulting from damage incurred from loading, transporting or unloading. Hazardous waste transportation is no exception and current packaging methods, i.e. bags, lend themselves to breakage, once again providing a clear path for material escape.

Further, it is known that the interiors of transport vehicle containment chambers are generally hotter than the outside ambient temperature. The principles of heat transfer cause a natural flow of air to occur within the chamber through any available apertures in an outward direction toward the cooler surrounding environment. This convection, if not controlled, results in a constant outward leakage of air, thus amplifying material escape.

Once material release has occurred, in any or all of the above described methods, the micro-sized particulates may become air borne freely exposing the surrounding unprotected environment to contamination. It is therefore necessary to control the flow of material leakage between the controlled chamber and the cargo chamber and within the confinement of the cargo chamber, whether the cargo chamber's access portal is opened or closed, during loading and unloading, and in temperate as well as adverse climatic conditions.

Current contaminant transportation apparatus are clearly not providing the containment controls necessary in common hazardous waste abatement operations. This has created a void between the removal procedure and the disposal site exposing human life to the same threat that the removal and disposal procedures were employed to prevent.

ADVANTAGES AND SUMMARY OF THE INVENTION

Accordingly, it is an advantage of the present invention to provide an apparatus for temporarily storing and transporting hazardous particulates that have been packaged pursuant to standard industry practice without relying on extending the controlled chamber where removal is taking place to the transport apparatus.

It is a further advantage of the present invention to provide a zone of controlled air outside the transport apparatus so as to eliminate the requirement that the controlled chamber where contaminant removal is taking place need be extended to encompass the transport apparatus.

It is another advantage of the present invention to provide a transport apparatus that may be readily moved between removal sites and need not be positioned at the removal site during all removal operations.

It is a still further advantage of the present invention to provide a system for transferring contaminant from one transport apparatus to another.

It is yet another advantage of the present invention to provide a method for handling and transporting contaminants.

The present invention provides a system for controlling escape of contaminants during removal from a site and during transport of the contaminants, comprising a movable platform, a chamber having a roof, walls and a floor mounted on said platform, an inlet opening for accessing the interior of said chamber, an outlet opening for exhausting air from said chamber, an air handling means for establishing an air-flow from said inlet opening through said chamber to said outlet opening, filter means for removing airborne contaminants from air flowing therethrough, and a wetting means for introducing a spray of liquid near said roof so that it settles to said floor and out a drain means thereby removing non-airborne contaminants from within said chamber.

The present invention further provides an automated system for controlling escape of contaminants during removal from a site and during transport of the contaminants, comprising a movable platform, a chamber having a room, walls and a floor mounted on said platform, an inlet opening for accessing the interior of said chamber, an air handling means for exhausting air from said chamber through said outlet opening so as to draw air from outside the chamber through said inlet opening, filter means for removing airborne contaminants from air flowing therethrough, wetting means for introducing a spray of liquid near said roof so that it settles to said floor and out a drain means thereby removing non-airborne contaminants from within said chamber, and control means for controlling said air handling means so as to vary the volume of air being drawn through said filter means.

The present invention still further provides an apparatus for handling contaminants, comprising a movable platform, a chamber having a roof, walls and a floor mounted on said platform, an inlet opening for accessing the interior of said chamber, an outlet opening for exhausting air from said chamber, and an air handling means for pulling air from outside said chamber through said inlet opening so as to create a zone of controlled air outside said chamber.

The present invention further provides a filtration means which includes an air handler unit (AHU) blower or fan system to pull air into the device. At least one filter is placed in the air stream to remove essentially all particulate from the air. Preferably, there is a series of three filters, connected such that the air must pass through all three filters in series of increasing efficiency, and including a HEPA-type filter, until substantially all, and preferably at least 99.99 percent, of the offending particulate greater than 0.3 micron in length is removed from the air. The HEPA type filter is an acronym for High Efficiency Particulate air filter as covered by Federal Standard 209 and Military Standard 282 and described in U.S. Pat. No. 3,498,032, incorporated herein by reference. This type of filter is also known in the industry as the "absolute" filter. An air filtering apparatus is described in U.S. Pat. No. 3,936,284 to Donald G. Mason with a filter system of spun fiberglass mat/adsorptive charcoal and a HEPA-type filter panel. U.S. Pat. No. 4,175,934 to Arnold Lang describes a "clear air device" utilizing a preliminary filter and a HEPA filter, both of which are incorporated herein by reference.

The present invention still further provides a method for handling contaminants comprising the steps of creating an air flow in a chamber of contaminated air, introducing a liquid spray to the air, passing the liquid spray through the air flow so as to remove airborne contaminants therefrom, filtering the remaining airborne particles from the air flow, exhausting the filtered air to the atmosphere, and collecting the sprayed liquid.

By way of example only, the present description will deal primarily with the transportation of waste asbestos from the controlled chamber of the removal site to the disposal site. With the above definition, however, it should be understood that the present invention may be useful in the safe transportation of many other forms of particulates. An exemplary list may include, but is not limited to: wood dust, coal dust, insulation materials, urea-formaldehyde, dioxins, silicates, arsenic, grain dust, PCB's and the like.

Also, by way of example only, the present description will deal primarily with the current art method of bagging the asbestos prior to transportation and the dumping procedures involving these bags. Although bagging of the particulate is most common, transfer of the particulate from the controlled chamber to the transport apparatus of the present invention in other fashions is also envisioned, e.g., by conveyor system, shoveling, or the like. Moreover, it should be noted that the use of the term "trailer" for the apparatus of the present invention is for example only. The present invention applies, but is not limited to, other transportation apparatus which may be adapted to the present invention, such as trucks, railroad cars, ship containers, storage containers, and the like, and is not limited to any particular size or dimension. In addition, it is contemplated that the present invention may be used to transfer particulates from one transport apparatus to another structure or transport apparatus, without the requirement that the transport apparatus and structure are designed to connect with one another and form an impermiable seal.

Given the above understanding, the present invention exemplified herein may be used to safely transport asbestos from the controlled chamber of buildings or structures where contaminant removal is taking place to designated disposal sites. The apparatus will effectively contain the asbestos during loading, while stationary or in transit and while unloading. The loading may also occur without the burdensome requirement that the apparatus be encompassed by the controlled chamber where contaminant removal is occurring.

BRIEF DESCRIPTION OF DRAWINGS

FIG. 1 is a schematic cross-section of a side elevation view of a trailer constructed in accordance with the present invention.

FIG. 2 is a schematic cross-section of a view along line A—A of FIG. 1.

FIG. 3 is a schematic front elevation view of a filter housing of the present invention.

FIG. 4 is a detail view, partially cutaway, of fluid reservoir tanks.

FIG. 5 is a frontal view of a control panel of the present invention.

FIG. 6 is a schematic front sectional view of a duct system constructed in accordance with the present invention.

DETAILED DESCRIPTION OF THE PREFERRED EMBODIMENT

Referring now to FIG. 1, a trailer 10 is equipped with a sealed chamber 12, mounted on a platform 4, which may include wheels 6, for containing and transporting particulate, such as asbestos and other hazardous wastes, commonly stored in bags 2. The interior walls 200, ceiling 202 and floor 14 sections of chamber 12 are constructed of non-absorbent materials, such as stainless-steel, aluminum, and the like. Chamber 12 includes an inlet in the form of portal 24, which may be opened or closed as desired. Floor 14 is designed to capture a wetting agent (not shown) and, by virtue of being slightly tilted, move it to a drain system, comprising a drain 16 leading to a filtered collection tank 18 via a collection pipe 20. Filtered collection tank 18 holds the wetting agent until it is released at a disposal site (not shown).

To control the air within the chamber 12, an air handler unit (AHU) 22, that will be described in greater detail below, is installed. The air handler unit pulls air completely through a filter assembly 40 mounted between the portal 24 and AHU 22 whether the portal 24 is open or closed. The AHU 22 is variably controlled by a software program (not shown) on a microprocessor 26, which, among other things, monitors the differential air pressure between a first sensor 212 positioned within chamber 12 and a second sensor 214 mounted outside the chamber 12 so as to maintain a pre-determined differential air pressure. The variably controlled AHU allows the system to continuously adjust to atmospheric changes, externally, and the loading or unloading of particulate, internally, in order to maintain the preferred air pressure differential between the chamber 12 and the outside ambient air.

Danger of airborne particulates escaping the enclosure is minimized by maintaining the air pressure within chamber 12 lower than the ambient air pressure surrounding chamber 12. Such air pressure differential is in the range of 0.01 to 0.1 and preferably 0.025 inches water, so as to not only assure that air inside chamber 12 is being drawn through the filter assembly 40, but to also draw and eventually allow processing of air from as much as 6 feet around the portal 24 which serves as an inlet to chamber 12. In other words, a zone of controlled air extends beyond the physical confines of the trailer and into the area surrounding the portal 24. Air movement will therefore be in an inward direction into the chamber 12 and towards AHU 22. Unsettled, airborne particulates will therefore remain within the enclosed area. The pressure differential is maintained by the AHU 22, which is described in greater detail below.

As will be appreciated, by drawing in air and airborne particulates from as much as 6 feet beyond portal 24 which serves as an inlet to chamber 12, the need to connect trailer 10 to a controlled chamber where contaminant removal is taking place (not shown) is eliminated. The unexpected and surprising advantage of extending the zone of controlled air is that contaminant removal from the contaminated site is made more efficient as the transporter need not be as concerned with handling of the bags 2 of particulate. It is also an unexpected and surprising advantage of extending the zone of controlled air that the present invention may be used to safely transfer the contaminant to other structures and other forms of transport vehicles. This is of particular significance in this age where disposal sites may be located in different communities, or even countries, from where removal is taking place.

As air driven by the AHU 22 moves from chamber 12, it passes through filtration assembly 40 to the AHU 22, from which it is exhausted to the outside through a plurality of louvered vents 56. Vents 56 are preferably constructed to direct the discharge air away from workers, pedestrians, or other vehicles in close proximity to trailer 10 by the arrangement of all vents 56 downward. Additionally, the downward arrangement of vents 56 is designed to minimize the effects of a headwind while the trailer 10 is moving or in a stationary position, thus helping to minimize the effects of back pressure through the AHU 22 and filter assembly 40.

Figure 1:
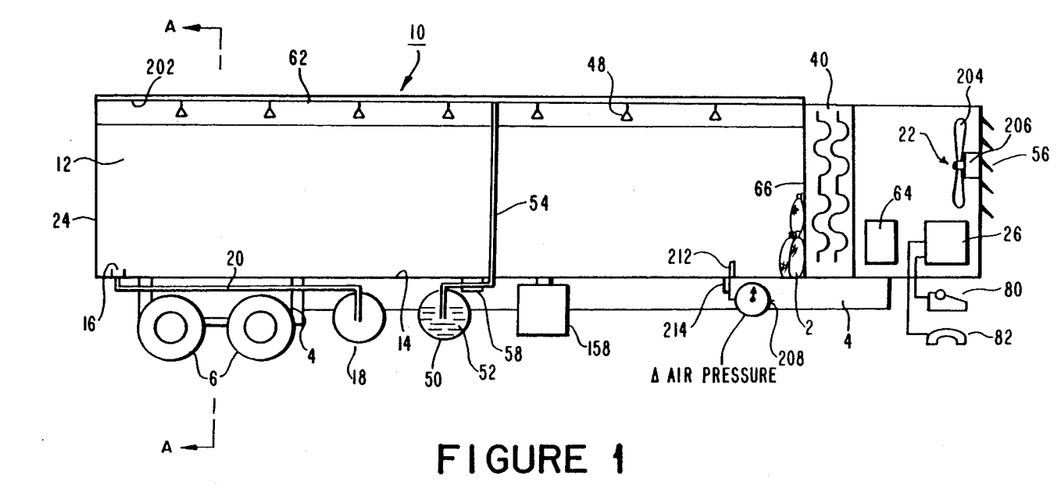
Figure 2:
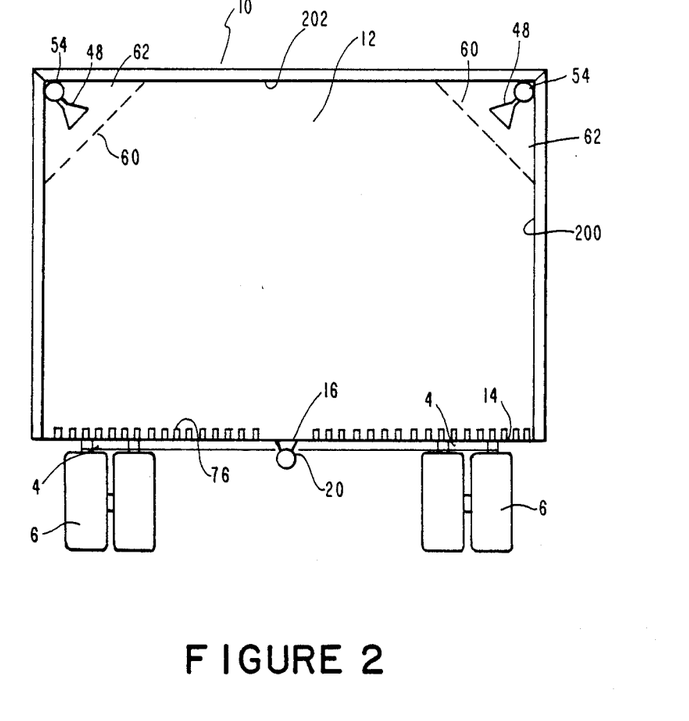

Turning now to FIG. 2, a back elevation schematic view of the present invention is shown illustrating the preferred construction of the floor 14 and the drain system described above. As will be appreciated, the provision of raised sections 76 on floor 14 allows that bags (not shown) of particulate may be stacked in chamber 12 without obstructing the flow of wetting agent (not shown) to drain 16.

Figure 3:
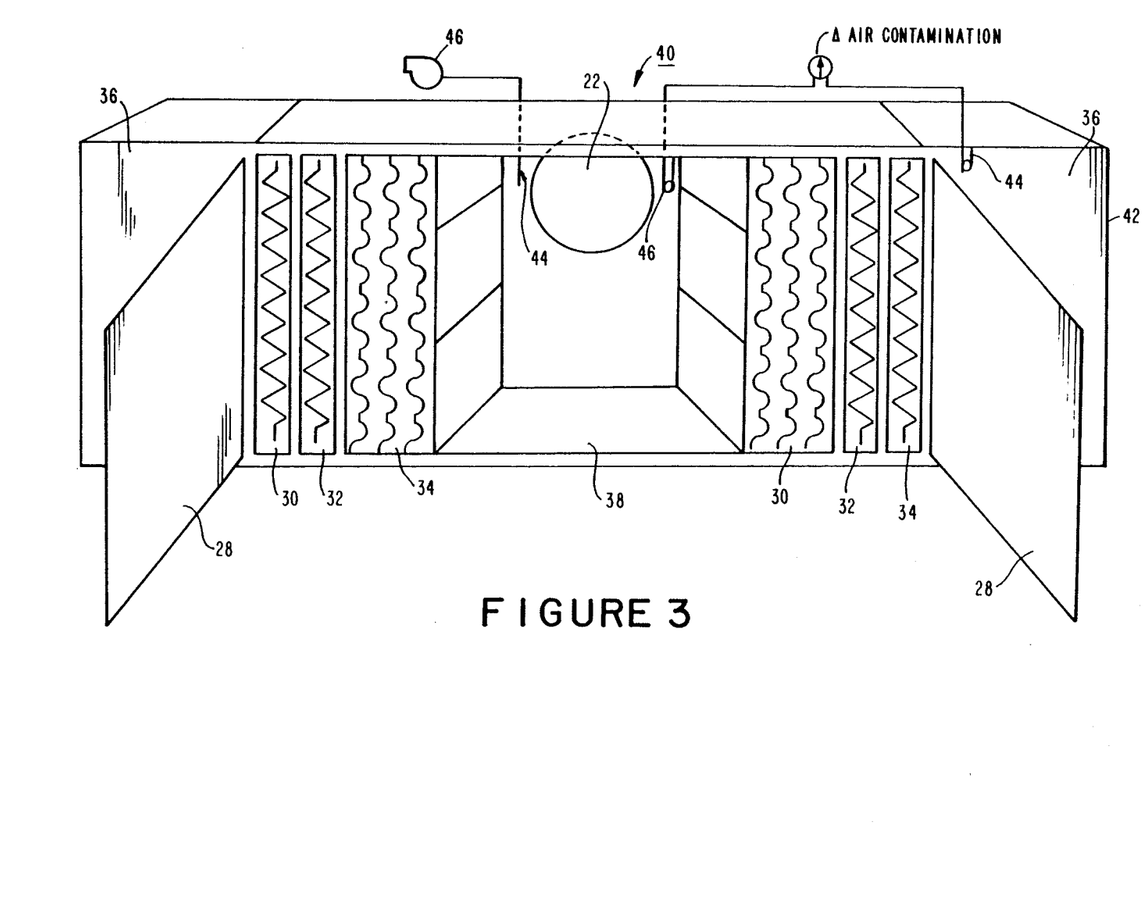
Figure 4:
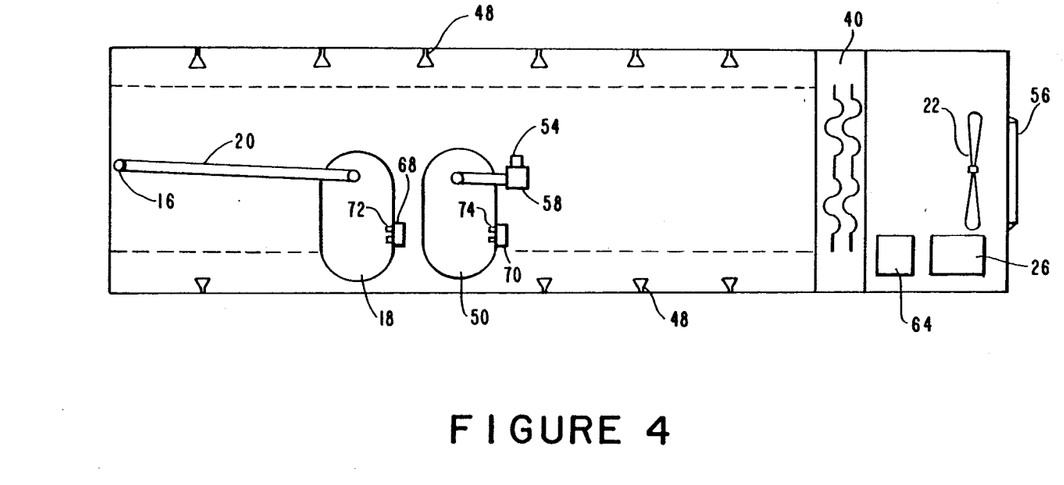
Figure 5:
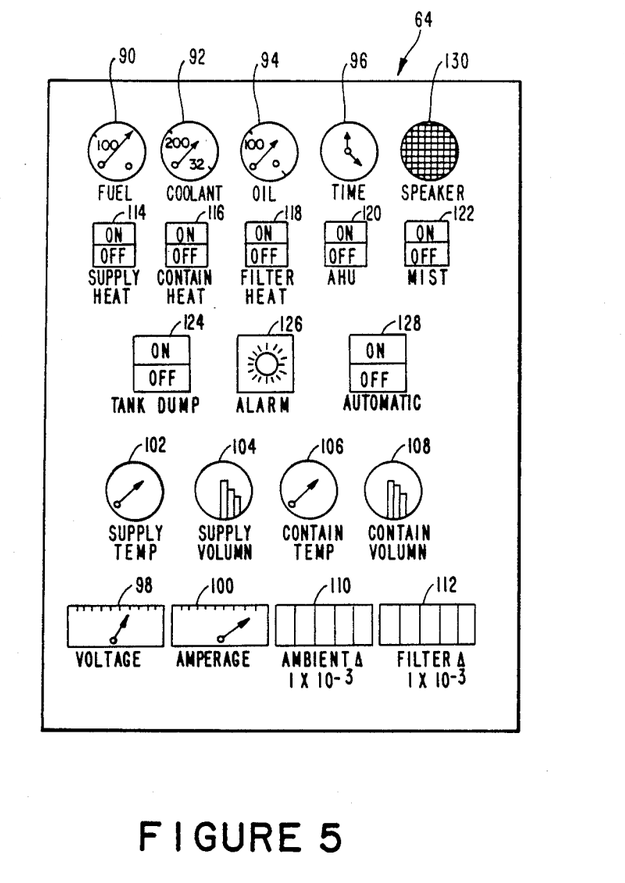
Figure 6:
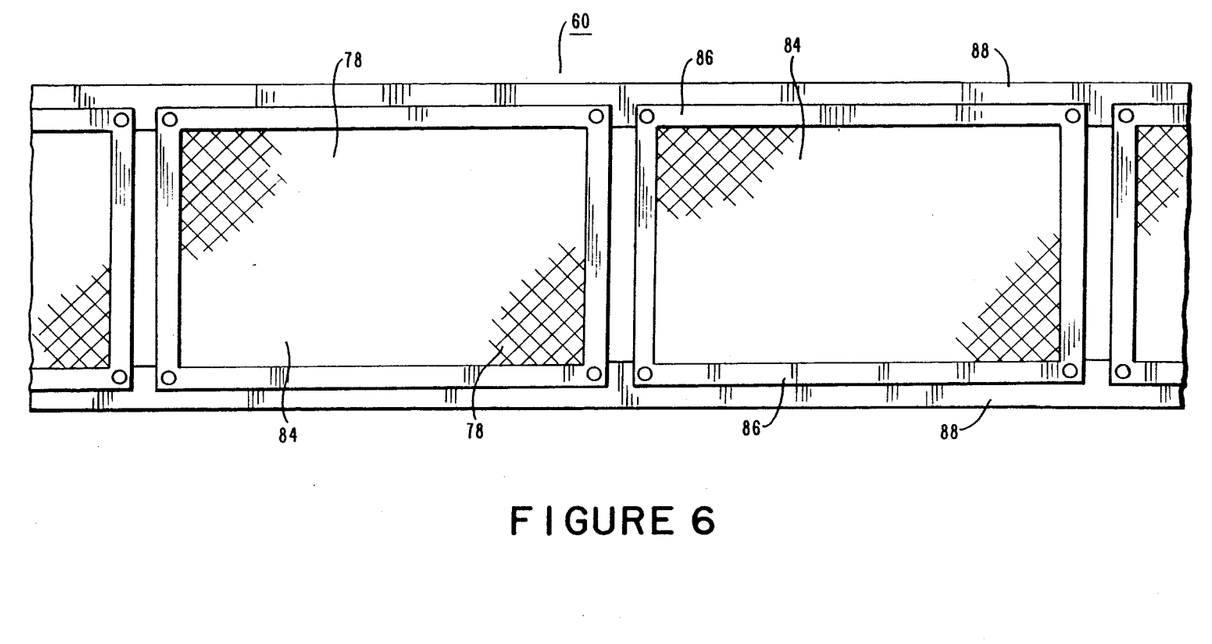

Because the cargo chamber 12 may be subjected to contamination by airborne particulates such as asbestos, released from damaged bags or due to the air escape during loading and compressing of the bags 2, a filter assembly 40, is installed upstream of the AHU 22. The filter assembly 40, seen generally in FIG. 3, is located at the front of chamber 12 and is serviced through access doors 28 from within the cargo chamber, thereby containing the particulate within chamber 12 during filter change. The filter assembly 40 preferably comprises a permanent, washable pre-filter 30 to remove moisture from the passing air flow, a secondary medium efficiency disposable filter 32 to collect larger particulates and a disposable HEPA type filter 34 for the required retention rate. While the AHU 22 is in operation, air both from within and outside chamber 12 is drawn into chamber 12 through portal 24 and in the direction of arrow B where any air borne particulates are directed to and trapped within the filter assembly 40, to a designated micron retention rate, thus cleaning the air before its release to the outside environment.

In practice, air enters filter assembly 40 from a pair of supply ducts 62 located along the ceiling 202 of chamber 12 and to a pre-filter plenum 36. The AHU 22 draws the air in the direction of arrow B through air ducts 62, through the dual three stage filter assembly and into a post-filter plenum 38. Clean air then exits via the AHU 22 and louvered vents 56. A filter assembly housing 42 encasing filters 30 to 34, when closed, provides an air tight seal forcing inbound air flow to pass through the filter media. The post-filter plenum 38 is equipped with an air sampler test fitting 44 which is connected to an air sampling unit 46 downstream of the air handler. A comparison of the level of contamination in the pre-filter plenum 36 versus that in the post-filter plenum 38, by virtue of air samplers 44 and 46, respectively, provides a means to test the efficacy of the filters 30 to 34 and to compare this to applicable regulations.

AHU 22 is comprised of a blower 204 driven by a blower motor 206, which is electrically powered, and preferably includes a variable torque frequency inventer (not shown) that allows operation of motor 206 over a range of 0 to 100% full load amps, thus proportionately changing the motors rotations per minute from 0 to 100% of the motor's design. Preferably, the motor's speed and/or torque may be varied in increments of as little as 0.1% of maximum. In practice, AHU 22 responds to commands from microprocessor 26 based on readings of outside air pressure versus chamber air pressure made by a differential pressure transducer 208.

The AHU 22 must have size and power capabilities sufficient to enable sufficient air flow through the system in accordance with the intended operation and degree of desired filtration by the filtration assembly 40. In order to maintain the desired lower air pressure in the chamber 12 relative to the outside air pressure even when the portal 24 is in an open position, air moving capabilities in the range of approximately 100 CFM up to 5,000 CFM may be desirable.

In operation, bags 2 of particulate are placed in chamber 12 generally from an end 66 towards portal 24. Bags 2 are generally stacked one on top of the other as high as the top 202 of chamber 12 in order to maximize the number of bags that may be carried. As will be discussed in more detail below, the construction of chamber 12 is such that the bags may be safely loaded to capacity of the chamber 12, without having to account for clearances required for the air handler unit to move air or by the wetting system, discussed below.

As the bags are being placed in the cargo chamber 12, AHU 22 is in operation, drawing air through the chamber and into filtration assembly 40 in order to prevent accidental release of contaminant into the environment. Accordingly, and as discussed above, the AHU 22 is preferably provided with means to vary the volume of air that is being pulled through the filtration assembly 40, with more air being handled when portal 24 is completely open than when it is closed. Since particulate that is too heavy to be trapped by the filtration means may be released into the cargo area, due to damage in loading or movement of the bags 2, a second means for preventing release of contaminant into the environment must be provided. Accordingly, a wetting system is provided comprising a wetting agent 52 flowing through nozzles 48 in an intersecting flow pattern designed to wet down the entire chamber 12. The wetting agent 52 serves two functions. First, it wets some of the airborne contaminant, thereby increasing its mass and causing it to fall to the chamber floor 14. Second, the wetting agent 52 wets the heavier particulate that is not airborne and directs it along the floor 14 to drain 16. As noted above, the liquid flow, including dissolved or suspended particulate, travels from the drain 16, through collection pipe 20, to filtered collection tank 18. The wetting system further comprises a reservoir 50 which contains a supply of wetting agent 52. As noted above, the preferred construction of floor 14 is such that wetting agent 52 carrying the particulate then enters the drain 16 and is carried along collection pipe 20 to filtered collection tank 18. The wetting agent supply is preferably regulated by a software program accessed by microprocessor 26 to last a minimum of one work day between refills of reservoir 50. Changes to the microprocessor's program and/or to the reservoir capacity may provide necessary adaptability to the length of time the apparatus may be safely used.

In practice, the filtered wetting agent is appropriately disposed of at a disposal site (not shown) by securing a hose (not shown) to a fitting 210 affixed to collection tank 18 and discharging the wetting agent through the hose.

As the present invention is designed for use in varied environments, it is preferably provided with means to both monitor and regulate the status of collection tank 19 and reservoir 50. As will be appreciated by those skilled in the art, monitoring of the fluid levels in reservoir 50 and collection tank 19 is important in order to assure that sufficient wetting agent 52 is present to contribute to control of particulate and that the particulate that has been wetted down can be safely stored in reservoir 50 prior to eventual disposal. Similarly, it is important that the temperature of collection tank 18 and reservoir 50 be regulated in order to assure that they do not freeze, thereby causing either the wetting means to be unusable because it has frozen in reservoir 50 or along pipe 54, and/or the capacity of the collection tank 19 to be minimized because of blockage from frozen collected particulate.

Turning now to FIG. 4, a detail view of the collection tank and reservoir is shown, which illustrates the provision of heaters 68 and 70 and temperature monitors 70 and 72. Heaters 68 and 70 are designed to be used when the outside air temperature falls below a predetermined level, preferably 40° Fahrenheit. Collection tank 18 is itself preferably provided with a removable filter 88, which is used to filter the majority of particulate from the wetting agents 52 prior to its eventual disposal.

As best seen in FIG. 2, nozzles 48 are preferably segregated from cargo chamber 12 by screens 60. Screens 60 serve a two-fold purpose. First, they do not allow stacked bags 2 of particulate, to impede the spray of wetting agents 52 from nozzles 48. Second, they form air duct 62 and assure that air flow to the filter means is uninterrupted notwithstanding having a plurality of bags 2 filling the chamber area and stacked against screens 60 of the air duct 62 itself. Air duct 62 is installed from the rear opening to the front of the chamber 12 and is attached to the filter assembly at the prefilter plenum. Screens 60 are preferably constructed of twisted vinyl covered wire 78, preferably in 1" to 2" squares, to provide the structure necessary to pass unrestricted air flow inward and unrestricted liquid flow from the nozzles 48 outward. Wire 78 is secured in a plurality of sections 84; each section having a frame 86. These framed sections 84 attach to a larger frame 88 that encompasses the entire duct system. Each section 84 is preferably removable for service access to the nozzles 48 and air duct 62.

The present invention is also equipped with an on board electrical generator 158 capable of producing the total required electrical output and may be provided with a standby feature to enable the user to have the option of connecting to and using "house power", when available, as opposed to that produced by generator 158. This electrical output may be used to power the microprocessor 26, the pump 58, the AHU 22 and a control means, discussed in more detail below. A rechargeable battery 146 may also be provided to store electricity produced by generator 158 for use in the event of an emergency.

As generally seen in FIG. 5, the control means of the present invention comprises an operator control panel 64 including gauges for monitoring the status of the generator 158, AHU 22, collection tank 18, reservoir 50, filters 30 to 34, and the wetting system. The status of generator 158 may be monitored via a fuel level gauge 90, which measures the amount of fuel available to power the generator, a coolant temperature gauge 94 for measuring the temperature of the generator cooling system, an oil pressure gauge 92, for measuring the generator's oil pressure, and a time in use meter 96, for measuring the time the generator has been in use for servicing purposes. The control panel 64 also may include means to monitor the status of the invention's electrical system, including a voltmeter 98 and an ampmeter 100. Temperature monitors 72 and 74 are displayed at a supply temperature gauge 102 and a container temperature gauge 106, used to monitor the temperature of heaters 68 and 70, respectively. Similarly, container vessel volume may be displayed at a container volume gauge 108, and reservoir volume displayed at a supply volume gauge 104. A digital readout 110 is provided to display the difference in external and internal chamber air pressure, and a digital readout 112 is provided to display the difference between pre-and post-plenum contaminant levels.

The trailer 10 may also be provided with commercially available programmable alarm features for cargo air pressure, filter change, supply and containment tank temperature, AHU operation, microprocessor temperature, line voltage, and the like. These alarms may be both audible and visual and utilize a voice messaging program to deliver current system status reports and alarm conditions. A printer 80 may also be supplied for historical data retrieval and a modem 82, both connected to microprocessor 26, made available for telecommunications; including, for example, program updates, system analysis and the like.

As will be appreciated by those skilled in the art, only certain components have been located within the cargo chamber 12, e.g., the filter means, air duct 62, the wetting means and the drain system. Servicing of these components is preferably accomplished from outside of cargo chamber 12, allowing full operational, service and maintenance access while not requiring the protective gear and procedures associated with handling of the contaminants. Likewise, the operator's controls and functions, being basic and fundamental, are preferably isolated from those technically requiring more extensive training, thereby limiting the scope and access of the operator to tasks directly related to operator training. This characteristic of the system's design enables the required technicians, representing independently specialized fields, to work and operate on a level within their own field of training, e.g., the abatement technician does not require a knowledge of microprocessing when moving cargo and the electronics technician is not required to wear a protective suit when servicing support equipment. This draws a clear line appropriately defining areas of responsibility while not sacrificing the integrity of the system.

We claim:

1. An apparatus for storing and transporting containers of contaminants, comprising:
   a movable platform;
   a chamber having a roof, walls, and a floor mounted on said platform;
   an inlet opening for accessing the interior of said chamber in order that the containers may be placed in said chamber and to allow introduction of air into said chamber;
   an outlet opening for exhausting air from said chamber;
   an air handling means for drawing air from outside the chamber through said inlet opening and establishing a negative air pressure relative to the air pressure outside the chamber;
   a filter means for removing airborne contaminants from air exhausting from said chamber;
   a wetting means for introducing a spray of liquid onto the containers so as to wet the containers and cause any contaminant clinging to the containers to settle to said floor and out a drain means
   the wetting means preferably located near the roof of said chamber so as to ensure maximum wetting of the chamber space and the containers; and
   said drain means leading to a storage vessel via a pipe.

2. The apparatus for handling contaminants of claim 1, further comprising a means for varying the action of said air handling means so as to vary the volume of air being drawn through said filter means.

3. The apparatus for handling contaminants of claim 1, wherein said filter means comprises a plurality of filters mounted between said inlet opening and said outlet opening.

4. The apparatus for handling contaminants of claim 3, wherein said filters are mounted in series, each subsequent filter capable of retaining a smaller size contaminant than the previous filter.

5. The apparatus for handling contaminants of claim 4, wherein one of said filters is a HEPA-type filter capable of filtering particles down to 0.1 microns in size.

6. The apparatus for handling contaminants of claim 2, further comprising a first air-pressure sensor mounted outside said chamber and a second air-pressure sensor mounted inside said chamber.

7. The apparatus for handling contaminants of claim 6, further comprising a means for determining the difference in air pressure monitored by said first and second air-pressure sensors and for controlling the means for varying the air handling means.

8. The apparatus for handling contaminants of claim 1, wherein:
   said drain means comprises said floor adapted to cause the runoff of said liquid to a drain in said floor and a collection tank connected to said drain by a first pipe; and
   said wetting means comprises a plurality of nozzles mounted on said roof and connected to a reservoir by a second pipe.

9. The apparatus for handling contaminants of claim 8, wherein at least one air duct leading from said inlet opening to said filter means is formed by a wire mesh mounted in a frame extending from said walls to said roof.

10. The apparatus for handling contaminants of claim 9, wherein said nozzles are within said air ducts.

11. An apparatus for storing and transporting containers of contaminants, comprising:
    a movable platform;
    a chamber having a roof, walls, and a floor mounted on said platform;
    an inlet opening for accessing the interior of said chamber in order that the containers may be placed in said chamber and to allow introduction of air into said chamber;
    an outlet opening for exhausting air from said chamber;
    an air handling means for drawing air from outside the chamber though said inlet opening and establishing a negative air pressure relative to the air pressure outside the chamber;
    a filter means for removing airborne contaminants from air exhausting from said chamber;
    a wetting means for introducing a spray of liquid onto the containers so as to wet the containers and cause any contaminant clinging to the containers to settle to said floor and out a drain means
    the wetting means preferably located near the roof of said chamber so as to ensure maximum wetting of the chamber space and the containers;
    said drain means leading to a storage vessel via a pipe;
    said storage vessel capable of storing the liquid prior to its disposal; and
    said air handling means creating a zone of controlled air outside said chamber.

12. The apparatus for handling contaminants of claim 11, further comprising a filter means mounted between said inlet opening and said outlet opening for removing airborne contaminants from air flowing therethrough.

13. The apparatus for handling contaminants of claim 12, wherein said filter means comprises a plurality of filters mounted in series, each subsequent filter capable of retaining a smaller size contaminant than the previous filter.

14. The apparatus for handling contaminants of claim 13, wherein one of said filters is a HEPA-type filter capable of filtering particles down to 0.1 microns in diameter.

15. The apparatus for handling contaminants of claim 12, further comprising a wetting means for introducing a spray of liquid near said ceiling so that it settles to said floor and out a drain means.

16. The apparatus for handling contaminants of claim 14, wherein said filter means includes a pre-screen filter for filtering moist airborne contaminants.

17. The apparatus for handling contaminants of claim 11, wherein said zone of controlled air extends from an edge of said inlet opening to 2 feet from said inlet opening.

18. The apparatus for handling contaminants of claim 11, wherein said zone of controlled air extends from 2 feet to 6 feet from said inlet opening.

19. An apparatus for handling contaminants of claim 15, wherein:

said drain means comprises a drain in said floor and a collection tank connected to said drain by a collection pipe;

said wetting means comprises a plurality of nozzles mounted on said roof and connected to a reservoir by a series of pipes;

at least one air duct leading from said inlet opening to said filter means is formed by a wire mesh mounted in a frame extending from said walls to said roof; and said nozzles are within said air ducts.

20. A method for storing and transporting containers of contaminants comprising the steps of:

creating an air flow in a chamber of contaminated air by lowering the air pressure inside the chamber relative to the outside air pressure;

placing the containers of contaminant into said chamber via an inlet opening;

introducing a liquid spray to the air;

passing the liquid spray through the air flow so as to remove airborne contaminants therefrom and so as to wet the contaminant containers and remove any contaminant clinging to the outside of the containers and having been accidently released from the containers;

filtering the remaining airborne particles from the air flow;

exhausting the filtered air to the atmosphere; and collecting the sprayed liquid in a containment vessel for eventual disposal.

* * * * *